United States Patent
Hofmeister

(10) Patent No.: US 10,628,112 B2
(45) Date of Patent: Apr. 21, 2020

(54) CHANGEABLE SIGNAGE SYSTEM

(71) Applicant: Tom L. Hofmeister, Eustis, FL (US)

(72) Inventor: Tom L. Hofmeister, Eustis, FL (US)

(73) Assignee: Wall Yak, LLC, Eustis, FL (US)

(\*) Notice: Subject to any disclaimer, the term of this patent is extended or adjusted under 35 U.S.C. 154(b) by 0 days.

(21) Appl. No.: 16/282,392

(22) Filed: Feb. 22, 2019

(65) Prior Publication Data

US 2020/0050418 A1    Feb. 13, 2020

Related U.S. Application Data

(60) Provisional application No. 62/717,917, filed on Aug. 13, 2018.

(51) Int. Cl.
| | | |
|---|---|---|
| *G06F 3/14* | (2006.01) | |
| *G06F 9/30* | (2018.01) | |
| *G06F 3/041* | (2006.01) | |

(52) U.S. Cl.
CPC .......... *G06F 3/1446* (2013.01); *G06F 3/0412* (2013.01); *G06F 9/3004* (2013.01); *G09G 2300/026* (2013.01)

(58) Field of Classification Search
None
See application file for complete search history.

(56) References Cited

U.S. PATENT DOCUMENTS

| | | |
|---|---|---|
| 1,163,750 A | 12/1915 | Grant |
| 2,698,470 A | 1/1955 | Buedingen |
| 2,746,189 A | 5/1956 | Bass |
| 3,987,597 A * | 10/1976 | Smrt ........................ A01G 9/16 52/764 |
| 4,451,997 A | 6/1984 | Jones |
| 4,505,061 A | 3/1985 | Neuburger et al. |
| 5,040,318 A * | 8/1991 | Ryan ........................ B42D 1/08 40/396 |
| 6,722,096 B2 | 4/2004 | Von Arx et al. |
| 7,401,428 B2 | 7/2008 | Harkins |
| 7,536,815 B2 | 5/2009 | Cheung |
| RE42,649 E * | 8/2011 | Schultz .................... G01C 9/28 33/1 G |
| 8,533,983 B2 | 7/2013 | Case |
| 9,396,672 B2 | 7/2016 | Rensmo |
| 2003/0154639 A1 | 8/2003 | Bowers et al. |

\* cited by examiner

*Primary Examiner* — Fan Zhang

(74) *Attorney, Agent, or Firm* — John V. Stewart

(57) ABSTRACT

An array of adjacent panels forms a display sign. Each panel has a frame that holds a display sheet showing a cellular portion of the sign. The display sheet covers a front of the frame. A border of the display sheet wraps around the sides of the frame and is trapped in a backside channel in each side member of the frame. Retainers pushed into the channel trap the border in the channel. Each frame may be quickly attached and released from a respective base attached to a wall or other support structure, allowing quick changes to all portions or selected portions of the sign. A mobile app may be provided that configures the sign in a camera image of the support structure, divides the sign into panels, and generates printer output in a selected printer page size for each panel, including the border.

9 Claims, 7 Drawing Sheets

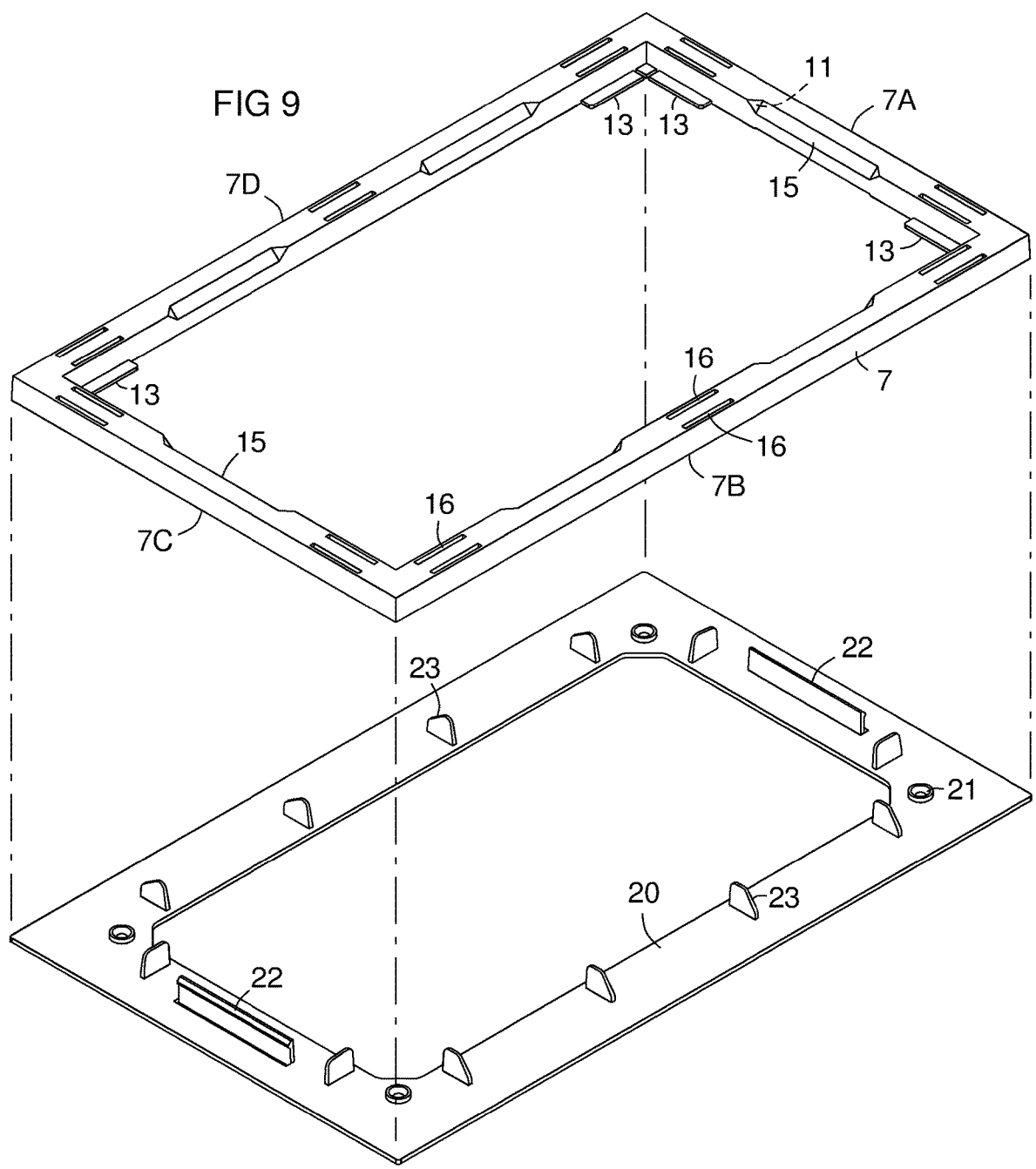

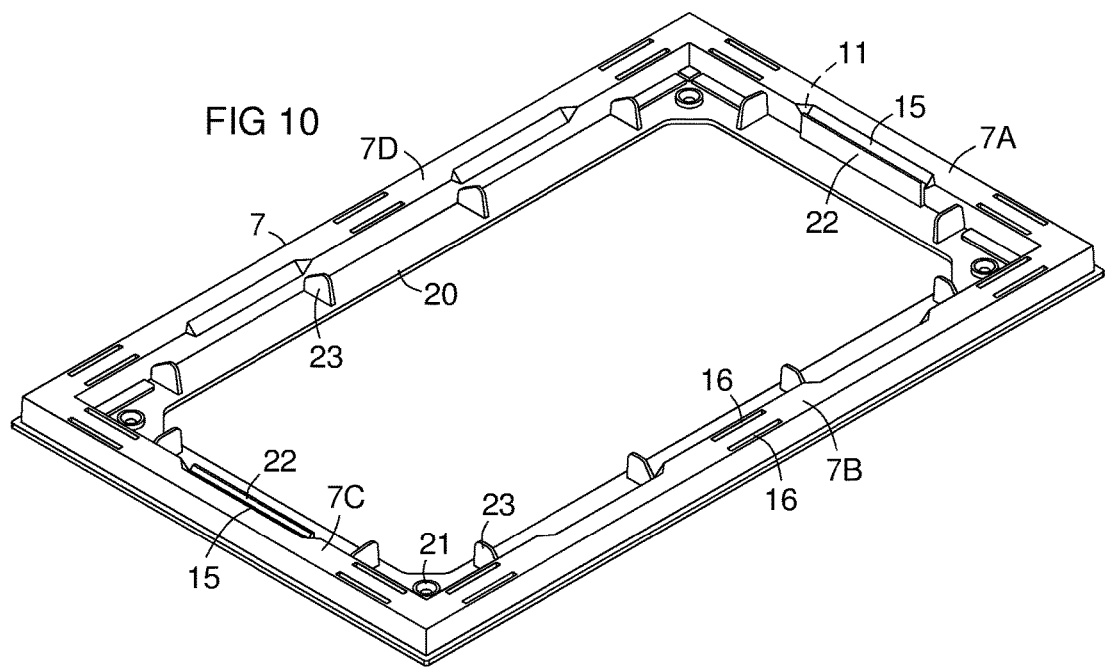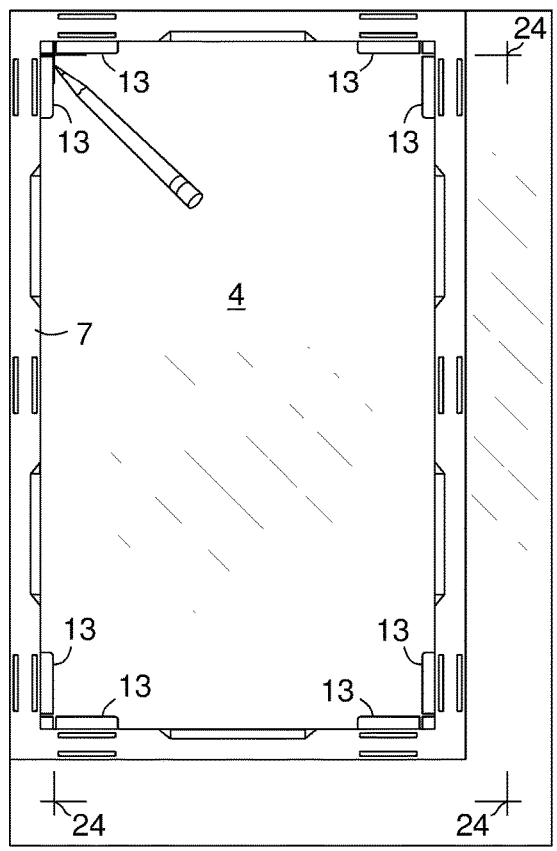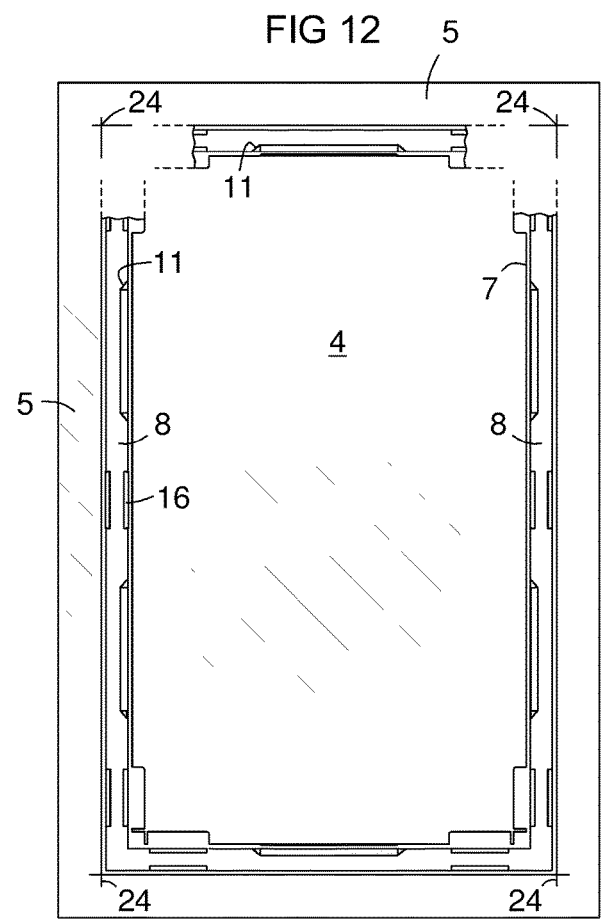

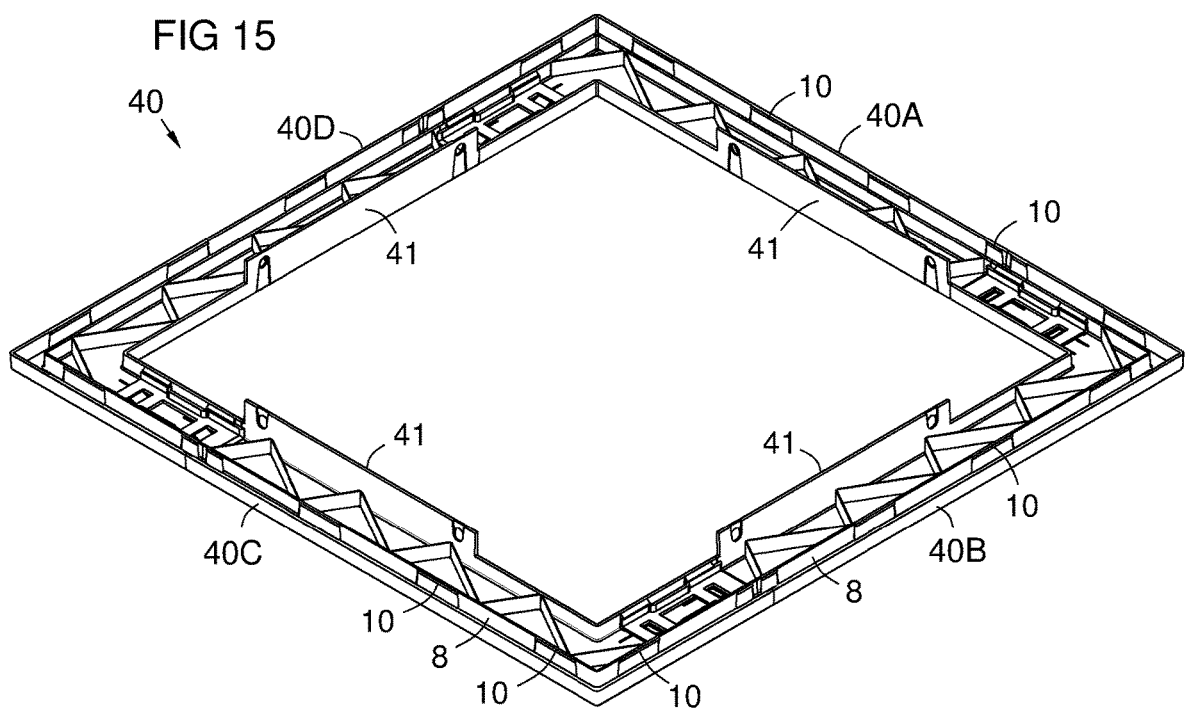

CHANGEABLE SIGNAGE SYSTEM

FIELD OF THE INVENTION

This invention relates to a system for creating a display sign on a wall or other support structure from an array of adjacent panels, where each panel is formed by frame holding a sheet displaying a cellular portion of the display.

BACKGROUND OF THE INVENTION

Signs with multiple changeable sub-elements improve flexibility, hasten updates, and reduce expense over signs with a single panel. U.S. Pat. No. 8,533,982 shows a sign formed from multiple panels installed on tracks. Each panel abuts other panels to display a larger combined image. Each panel displays a cellular portion of an array forming the larger image. Parts of the image can be quickly changed without changing the whole sign. For example one panel may show the price of a displayed food item at a restaurant. The price is changeable by replacing only that single panel, without changing other panels.

SUMMARY OF THE INVENTION

An objective of the invention is provision of a system for quickly creating and changing a sign made of multiple printable panel sheets held by respective panel frames in an array that displays a combined larger image.

Another objective is such a sign with panel frames that quickly stretch, hold, and release respective printed panel sheets without adhesives.

Another objective is such a sign providing quick mounting and quick release of each panel frame individually.

Another objective is such a sign providing sign design software that fits a selected display onto a designated wall space, divides the selected display into multiple printable panel images in a selected print size format, and includes a border on each sheet for wrapping around the edges of the respective panel frame for attachment thereto.

BRIEF DESCRIPTION OF THE DRAWINGS

The invention is explained in the following description in view of the drawings that show:

FIG. 9 is a front isometric exploded view of the frame and base.

FIG. 10 is a front isometric view of the frame and base snapped together.

FIG. 11 is a back view of a panel sheet with a panel frame placed backside down on the back of the sheet for marking corners of a margin on the sheet.

FIG. 12 is a back view of the frame placed front side down on the back of the sheet and aligned with the margin corner marks on the sheet.

FIG. 15 is a back isometric view of an alternate panel frame embodiment.

DETAILED DESCRIPTION OF THE INVENTION

Figure 1:
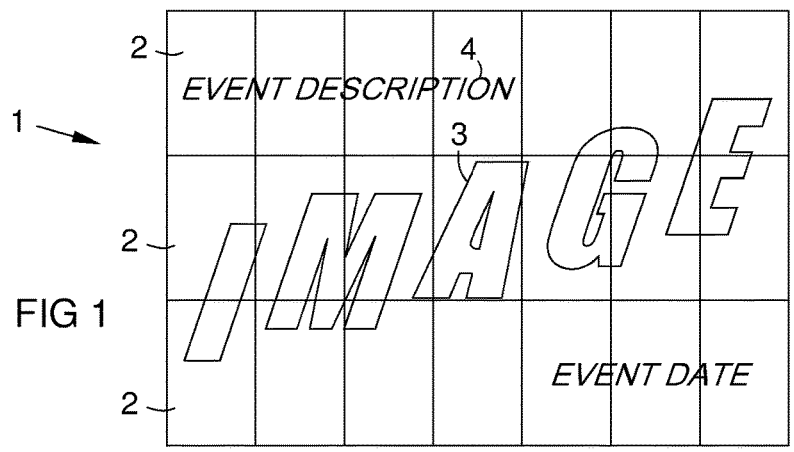
FIG. 1 is a front view of a multi-panel sign showing aspects of the invention.

FIG. 1 shows a sign 1 formed from an array of panels 2. Each panel displays a cellular portion of the sign including respective parts of an image 3 and/or message 4. Each panel is mounted adjacent to one or more other panels in the array to form the combined display. The display may be rectangular or other shapes. The panels may be rectangular as shown, and/or other cellular shapes that nest against other panels of the same or different shapes to cover an area, including for example panels that are square, triangular, semicircular, hexagonal, or pie shaped.

Figure 2:
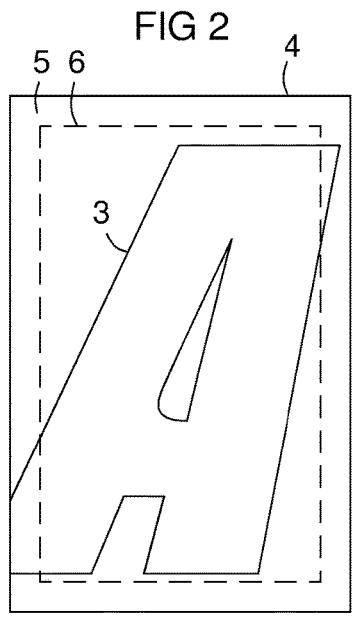
FIG. 2 is a front view of a panel image sheet.

FIG. 2 shows a panel display sheet that may be paper or other sheet material, including plastic, with a printed image portion 3. A border 5 is provided beyond a margin 6 of the viewable portion. The dashed line indicates the margin 6. It may be printed on the back of the sheet, but this is not necessary when using margin corner marking as later described. The border wraps around the periphery of the frame of FIG. 3.

Figure 3:
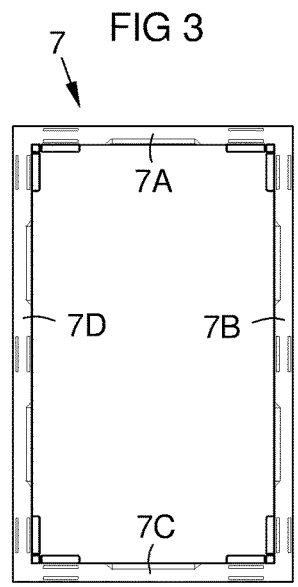
FIG. 3 is a front view of a panel frame for holding a panel image sheet.
Figure 4:
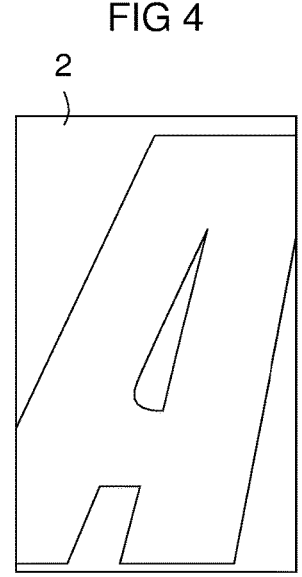
FIG. 4 is a front view of the image sheet of FIG. 2 mounted on the frame of FIG. 3.

FIG. 3 shows a panel frame 7 with side members 7A-D that stretch and hold a panel sheet 4 without adhesives as later shown. The sheet 4 is placed front-face-down on a flat surface. The frame is placed front-side-down on the sheet with the periphery of the frame aligned with the margin 6. The border 5 of the sheet is then wrapped around the sides of the frame and retained in backside channels in the frame as later shown. FIG. 4 is a front view of a panel 2 after attaching the sheet 4 to the frame 7.

Figure 5:
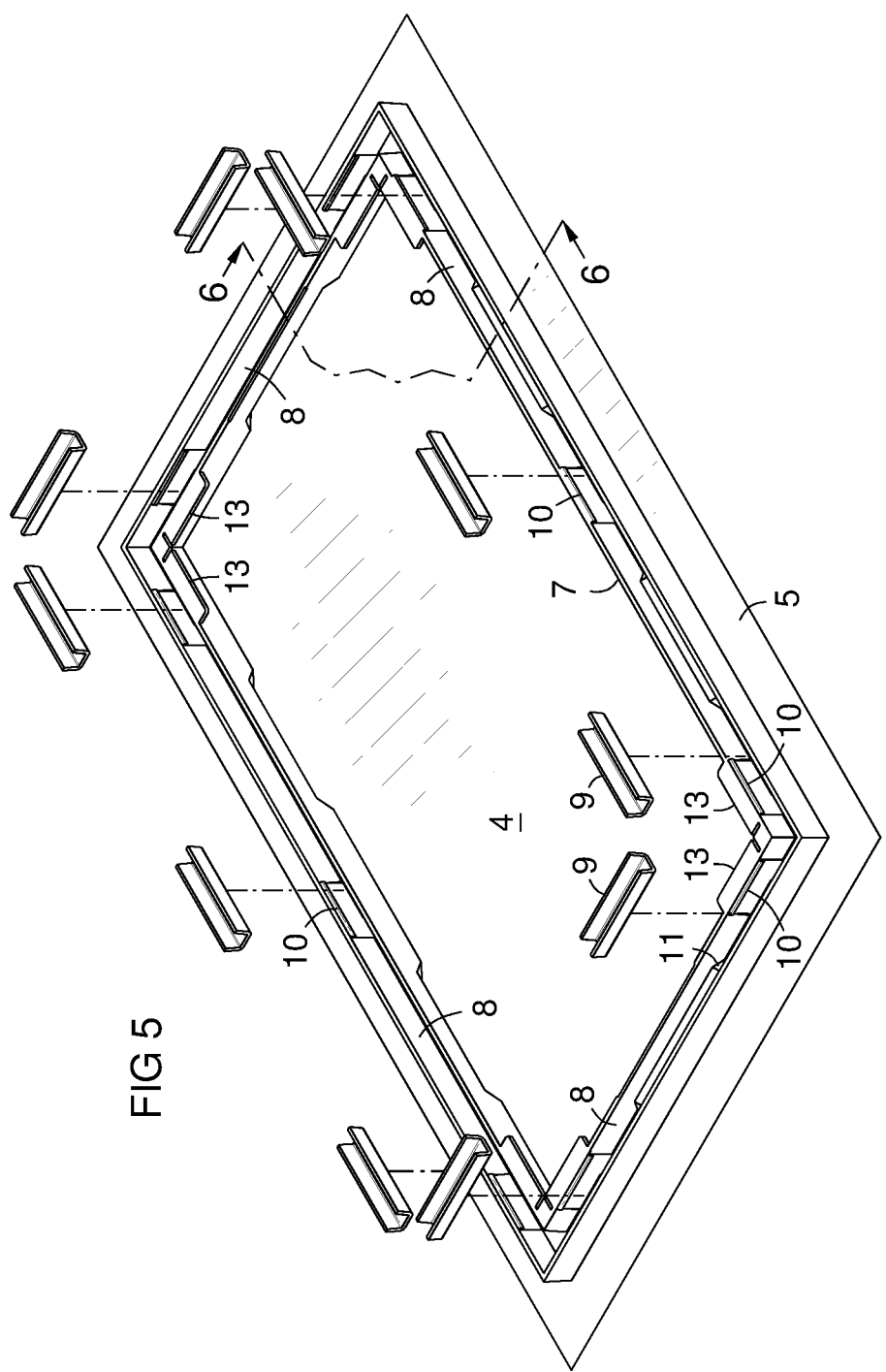
FIG. 5 is a back isometric view of a panel frame on a panel sheet, and clips for trapping the borders of the sheet in a channel of the frame.

FIG. 5 is a back view of a panel frame 7 placed on the back side of a panel sheet 4. The frame sides have a backside channel 8 over which the border 5 of the sheet is folded, then clips 9 are inserted into the channel, trapping part of the border as later shown. The clips may be formed as U-channel segments or other shapes, preferably with lateral elasticity. Inward facing lips 10 may be provided at the back edges of the channels to firmly retain the clips. Ramps 11 may be provided in the channels to facilitate removal of the clips as later shown. Margin marking guides 13 may be provided for use as later shown.

Figure 6:
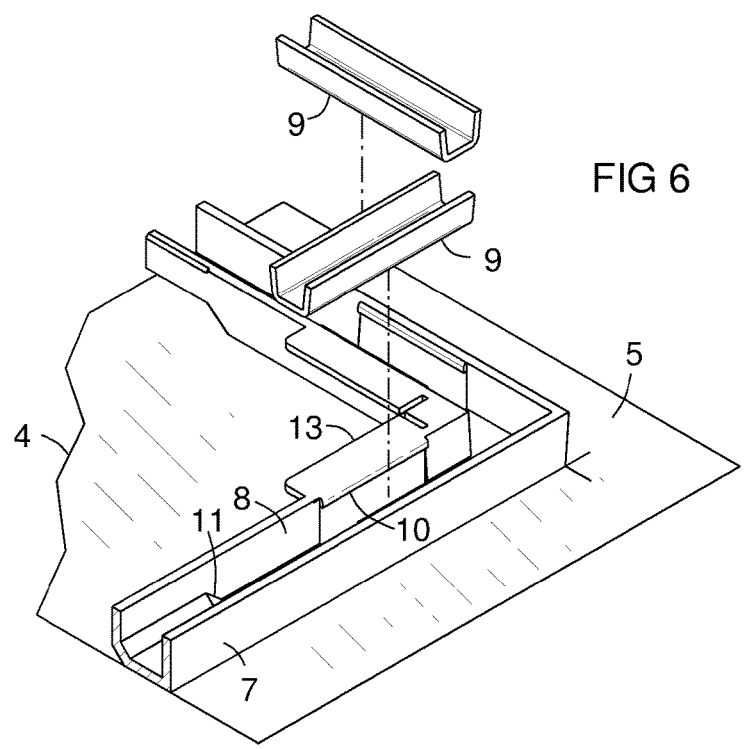
FIG. 6 is a cutaway view taken on line 6-6 of FIG. 5.
Figure 7:
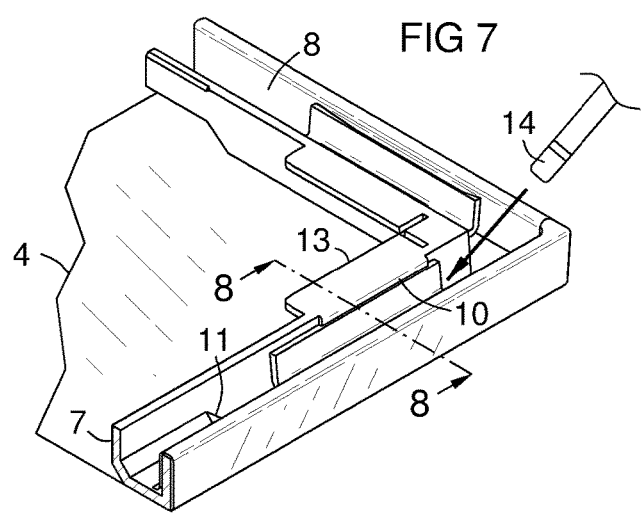
FIG. 7 is view as in FIG. 6 with the sheet border trapped in the frame channel by the clips.
Figure 8:
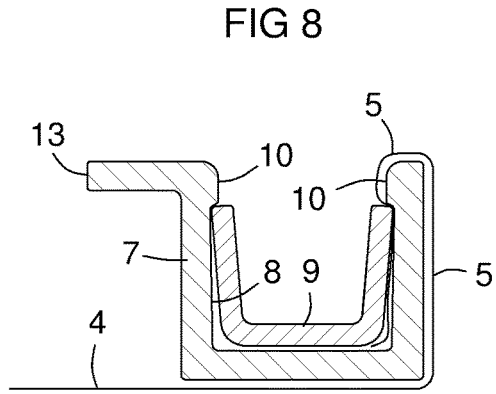
FIG. 8 is an enlarged sectional view taken on line 8-8 of FIG. 7.

FIG. 6 is a cutaway view taken on line 6-6 of FIG. 5. FIG. 7 is a view as in FIG. 6 with the border 5 of the sheet 4 wrapped around the sides of the frame 7 and trapped in the backside channel 8 of the frame by the clips 9. Each clip is easily removed by pushing it toward the ramp 11 with a pencil eraser 14 or any thin implement. This moves it out from under the lips 10 and into the ramp 11, which ramps the end of the clip out of the channel 8 for finger gripping. FIG. 8 is a sectional view taken on line 8-8 of FIG. 7 showing a clip 9 trapping the border 5 of the panel sheet 4 in the backside channel 8 of the panel frame 7.

FIG. 9 shows a panel frame 7 positioned for mounting on a base 20. The base can be attached to a wall or other support structure by peel-and-stick tape provided on the back of the base (hidden in this view) or by screws or bolts in holes 21 in the base or by other means. The frame snaps onto the base with quick connection devices 22, 15 that are releasable without tools. The quick connection devices are preferably located at least on the upper 7A and lower 7C side members of the frame as shown. For example, hooks 22 on the base may snap into mating surfaces 15 on the frame 7. The mating surfaces 15 may be angled depressions on the inner front edges of two opposed frame side members. The ends of these depressions may form the ramps 11 on the inner surface of the backside channels for removing the clips. Slots 16 may be provided on the front of the frame at the locations of the clips 9 (FIG. 5), adding flexibility to the walls of the backside channel 8 to facilitate spreading of the lips 10 for clip insertion and removal. Centering tabs 23 on the base center the frame as it is pushed onto the base. FIG. 10 shows the panel frame 7 mounted on the base 20. The hooks 22 on the base are snapped into the depressions 15 on the frame. The panel display sheet 4 is not shown here.

FIG. 11 shows a step of making margin corner marks on the back side of the panel sheet 4. A panel frame 7 is placed with its back side down on the back side of the sheet 4 aligned with a corner of the sheet. Marks are made against the margin marking guides 13, producing crossing corner marks 24 as shown already done in the other corners. This is repeated for each corner of the sheet 4, or at least for two corners of the sheet.

FIG. 12 shows the panel frame 7 placed with its front side down on the back side of the panel sheet 4. The corners of the panel frame are aligned with the corner marks 24. The corner marks may be cross marks as shown that extend into the border 5, so the marks are not completely hidden by the frame when it is aligned with them. Now the borders 5 can be folded over the frame and trapped in the backside channel 8 as shown in FIGS. 6 and 7.

Figure 13:
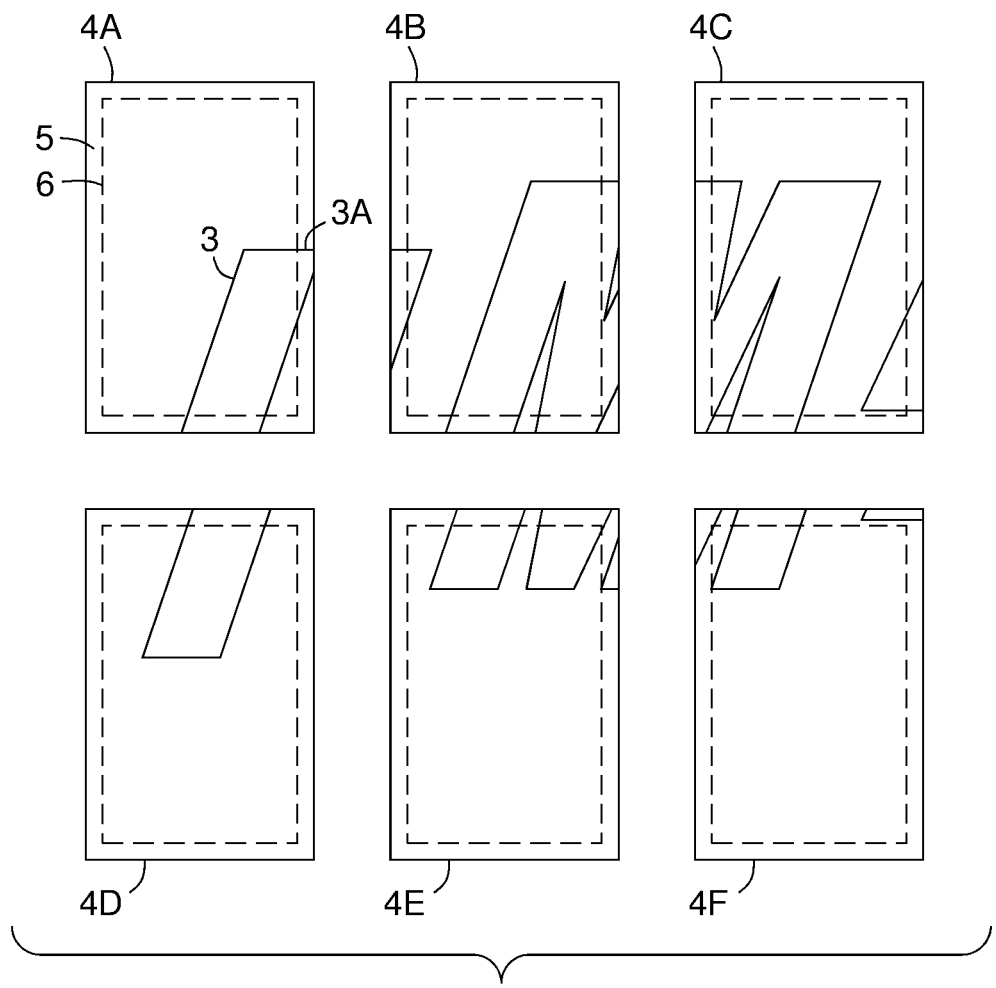
FIG. 13 is a front view of 6 of the 21 display sheets needed for the sign of FIG. 1.

FIG. 13 shows printed panel sheets 4A-4F for 6 of the 21 panels 2 of FIG. 1. Computer software may be provided that photographs and/or graphically creates a sign, fits it to an area interactively drawn by a user on a wall or other support structure viewed through a mobile device camera, determines the number of panels needed to create the sign for a given frame size, and creates images at a given printer size for each of the panel sheets as shown. The border 5 is included in the printed size. The images 3 may extend 3A beyond the margins 6 into the borders 5. This overlapping image portion wraps around the frame, and minimizes the appearance of gaps between the panels in the installed array.

Figure 14:
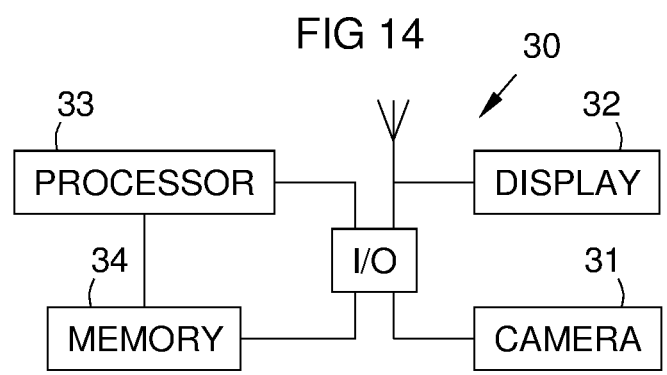
FIG. 14 is a schematic diagram of a device for configuring a sign as described.

FIG. 14 is a schematic view of a mobile device 30 for configuring the display sign, comprising: a camera 31; a touch sensitive display 32; a processor 33 controlling the camera and the display; and a memory 34. A program in the memory is executed by the processor and performs the following steps:
 a) Inputs or interactively creates an image for the sign;
 b) Inputs a selected printer page size matching an available panel frame;
 c) Displays live images from the camera on the display;
 d) Presents a graphical user interface on the display that enables outlining an area for the sign on a support structure shown in the live images;
 e) Displays the sign on the outlined area in the display as it will appear;
 f) Determines the scale of the sign as shown in the display. This can be done by measuring the distance to the support structure via an autofocus distance input from the camera, or it can be done by recognition of an object with a known dimension in the live images. Object recognition is enabled by algorithms and neural networks known in computer vision. For example, a yardstick may be leaned against the support structure, or furniture in the field of view may be analyzed to approximate the scale;
 g) Calculates the size and number of panels needed to create the sign from display sheets of the selected printer page size; and
 h) Generates printer output in the selected page size, including the borders.

FIG. 15 shows the back side of an alternate panel frame design 40 that attaches directly to a support structure without snapping to an individual base per panel.

FIG. 15 is a back view of an alternate frame embodiment 40 that attaches directly to a wall or other support structure such as an outdoor sign structure. It has side members 40A-D, which may each be molded in the same mold, then interconnected to form a square frame as shown. It has a backside frame channel 8, which may have pairs of inward facing lips 10 to retain clips as previously described. It has attachment devices 41 for attachment to the support structure or to brackets thereon. For example, wing bolts may be used in the shown devices 41 to attach to respective brackets on the support structure, allowing removal of the frame 40 without tools.

While various embodiments of the present invention have been shown and described herein, such embodiments are provided by way of example only. Variations and substitutions may be made by those skilled in the art without departing from the invention herein. Accordingly, the invention is to be limited only by the scope and intended meaning of the appended claims.

The invention claimed is:

1. A display sign comprising:
an array of panels;
each panel comprising a frame of side members that hold a display sheet displaying a cellular portion of the sign;
a backside frame channel in each side member of the frame
the display sheet covering a front of the frame; and
a border of the display sheet wrapped around the side members and trapped by a removable retainer within each backside frame channel that pushes the border against an inner surface of the channel in each side member of the frame.

2. The display sign of claim 1, further comprising;
a lip on a back edge of the frame channel that retains the retainer within the frame channel.

3. The display sign of claim 1, wherein each frame comprises a margin marking guide that guides a manual marking instrument to mark inner corners of the border on a back of the display sheet.

4. The display sign of claim 1, wherein each frame comprises a margin marking guide on an inner corner of each intersection of the sides of the frame, the marking guide comprising two guide surfaces that guide a manual marking instrument to make two marks that cross at each inner corner of the border on a back of the display sheet.

5. The display sign of claim 1, wherein the retainer comprises a plurality of clips, each clip comprising a U-channel segment inserted into the frame channel and trapping the border of the display sheet therein.

6. The display sign of claim 5, further comprising;
two opposed retention lips on a back edge of the frame channel for each clip, the two lips retaining each clip within the frame channel; and
a ramp in the frame channel proximate an end of each clip;

wherein pushing the clip toward the ramp moves the leading end of the clip beyond the retention lips and along the ramp out of the frame channel for removal of the clip from the frame channel.

7. The display sign of claim 1, further comprising;

a base for each panel frame;

an attachment device on the base that attaches the base to a wall;

first and second mating connection devices on the base and frame respectively for releasably snapping the frame to the base without tools.

8. The display sign of claim 7, wherein the first mating connection device comprises a respective hook on upper and lower side members of the base, and the second mating connection device comprises a respective receiving area for the hook on an inner front surface of upper and lower side members of the frame.

9. The display sign of claim 7, wherein the attachment device on the base comprises peel-and-stick tape provided on the back of the base that attaches the base to the wall.

* * * * *